(12) United States Patent
Wolrich et al.

(10) Patent No.: US 9,361,106 B2
(45) Date of Patent: Jun. 7, 2016

(54) SMS4 ACCELERATION PROCESSORS, METHODS, SYSTEMS, AND INSTRUCTIONS

(71) Applicant: Intel Corporation, Santa Clara, CA (US)

(72) Inventors: Gilbert M. Wolrich, Framingham, MA (US); Vinodh Gopal, Westborough, MA (US); Kirk S. Yap, Framingham, MA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 14/142,724

(22) Filed: Dec. 27, 2013

(65) Prior Publication Data

US 2015/0186138 A1    Jul. 2, 2015

(51) Int. Cl.
     *G06F 21/00*      (2013.01)
     *G06F 9/30*      (2006.01)
     *G06F 21/60*      (2013.01)
     *G06F 9/38*      (2006.01)

(52) U.S. Cl.
     CPC ........ *G06F 9/30145* (2013.01); *G06F 9/30032* (2013.01); *G06F 9/30036* (2013.01); *G06F 9/3895* (2013.01); *G06F 21/602* (2013.01)

(58) Field of Classification Search
None
See application file for complete search history.

(56) References Cited

U.S. PATENT DOCUMENTS 6,925,553 B2 * 8/2005 Roussel et al. ................ 712/245
8,538,015 B2    9/2013 Gueron et al.
2006/0265563 A1 * 11/2006 Goettfert et al. .............. 711/164
2009/0204824 A1 * 8/2009 Lin et al. ........................ 713/193
2009/0323930 A1 * 12/2009 Lu et al. .......................... 380/28
2010/0046448 A1 * 2/2010 Peisa et al. ..................... 370/329

OTHER PUBLICATIONS

Babu M., et al., "Pipelined Sms4 Cipher Design for Fast Encryption Using Twisted BDDS-Box Architecture", retrieved from Web on Jul. 17, 2015, pp. 26-30. (Only Abstract).
Diffie, et al., "SMS4 Encryption Algorithm for Wireless Networks", Translated and typeset by Whitfield Diffie of Sun Microsystems and George Ledin of Sonoma State University, Version 1.03, May 15, 2008, 6 pages.
Akdemir, Kahraman, et al., "Breakthrough AES Performance with Intel AES New Instructions" Intel White Paper, Apr. 14, 2010, 12 pages.
Diffie, et al., "SMS4 Encryption Algorithm for Wireless Networks", Version 1.03, May 15, 2008, 6 pages.
Shay Gueron, "Intel® Advanced Encryption Standard (AES) Instructions Set", Intel White Paper, Sep. 2012, 94 pages.

* cited by examiner

*Primary Examiner* — Hadi Armouche
*Assistant Examiner* — Andrew Steinle
(74) *Attorney, Agent, or Firm* — Vecchia Patent Agent, LLC

(57) ABSTRACT

A processor of an aspect includes a plurality of packed data registers and a decode unit to decode an instruction. The instruction is to indicate one or more source packed data operands. The one or more source packed data operands are to have four 32-bit results of four prior SMS4 rounds. The one or more source operands are also to have a 32-bit value. An execution unit is coupled with the decode unit and the plurality of the packed data registers. The execution unit, in response to the instruction, is to store a 32-bit result of a current SMS4 round in a destination storage location that is to be indicated by the instruction.

23 Claims, 15 Drawing Sheets

FIG. 3
SMS4 ENCRYPTION ROUND OPERATION 330
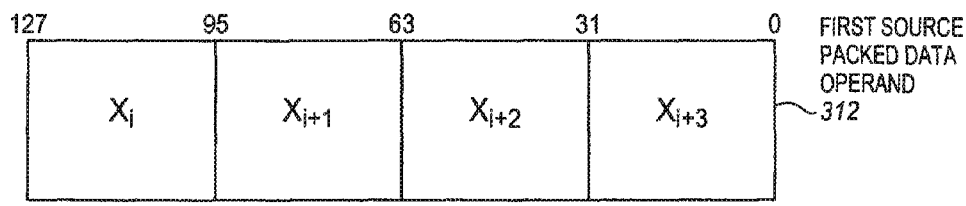
FIRST SOURCE PACKED DATA OPERAND 312
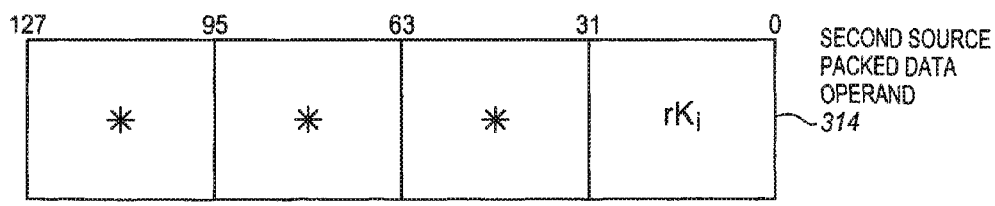
SECOND SOURCE PACKED DATA OPERAND 314
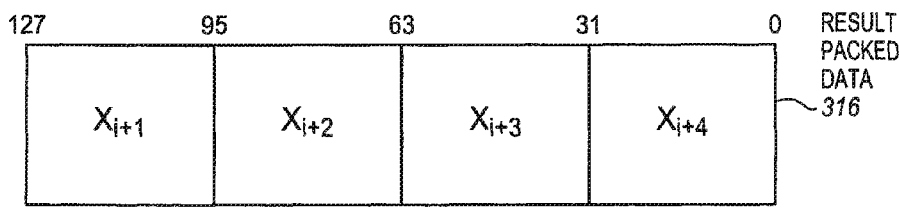
RESULT PACKED DATA 316
334 THREE RESULTS FROM THREE IMMEDIATELY PRIOR ENCRYPTION ROUNDS SHIFTED BY ONE POSITION RELATIVE TO FIRST SOURCE
332 RESULT OF CURRENT ENCRYPTION ROUND

FIG. 4
SMS4 KEY EXPANSION ROUND OPERATION 440
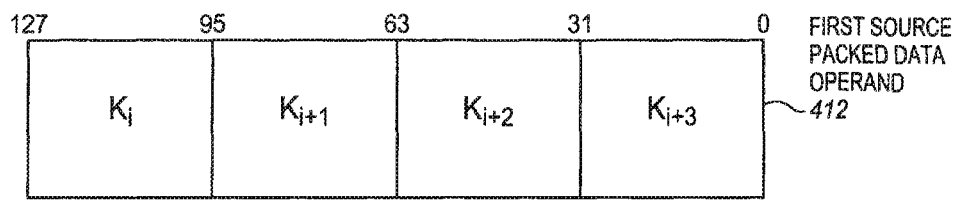
FIRST SOURCE PACKED DATA OPERAND 412
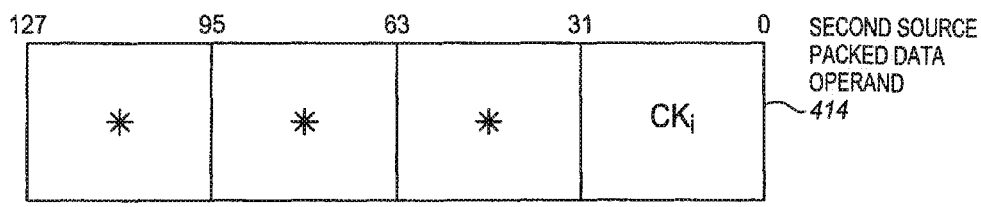
SECOND SOURCE PACKED DATA OPERAND 414
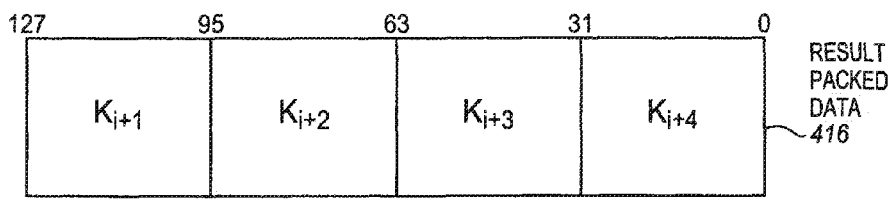
RESULT PACKED DATA 416
444 RESULTS OF PRIOR KEY EXPANSION ROUNDS FROM FIRST SOURCE SHIFTED BY ONE POSITION
442 RESULT OF CURRENT KEY EXPANSION ROUND 770-1

| SMS4 CRYPT OPCODE 771 | FIRST SOURCE SPECIFIER 774 | SECOND SOURCE SPECIFIER 776 | DESTINATION SPECIFIER 778 |
|---|---|---|---|

770-2

| SMS4 KEY EXPANSION OPCODE 772 | FIRST SOURCE SPECIFIER 774 | SECOND SOURCE SPECIFIER 776 | DESTINATION SPECIFIER 778 |
|---|---|---|---|

| SMS4 OPCODE 781 | CRYPT OR KEY EXPANSION SELECTOR 782 | FIRST SOURCE SPECIFIER 774 | SECOND SOURCE SPECIFIER 776 | DESTINATION SPECIFIER 778 |
|---|---|---|---|---|

*FIG. 7B*

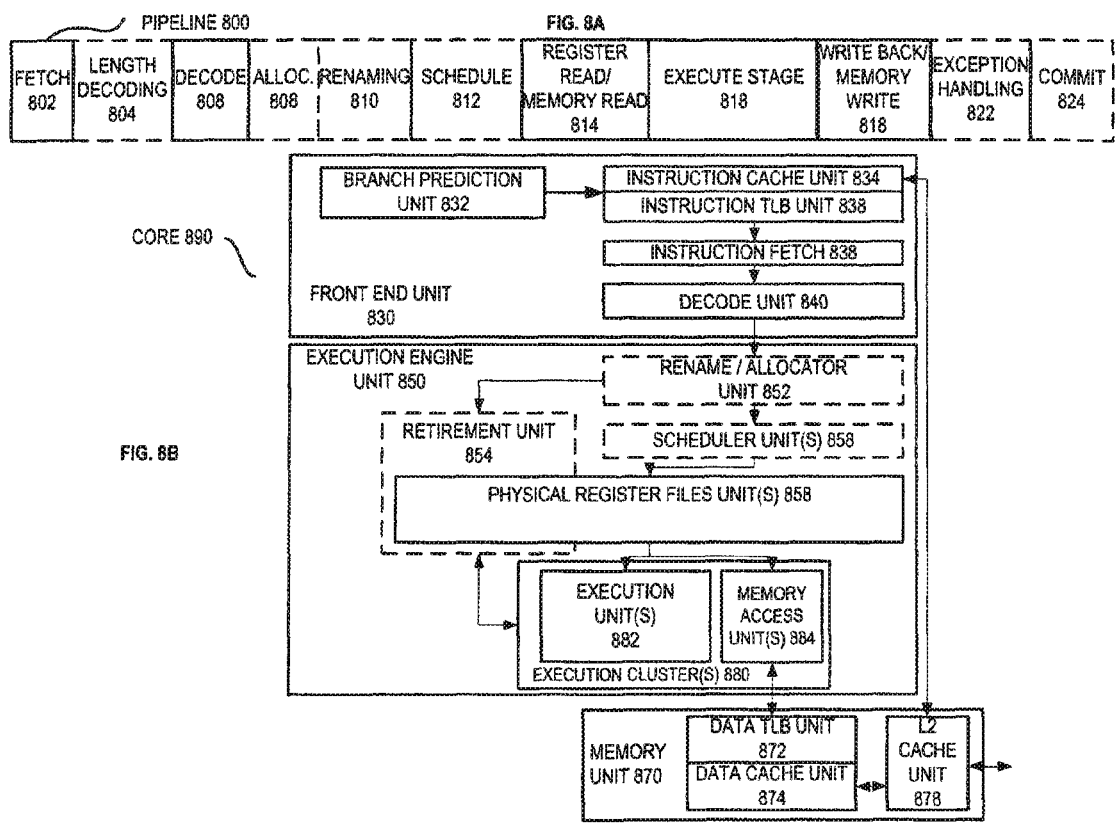

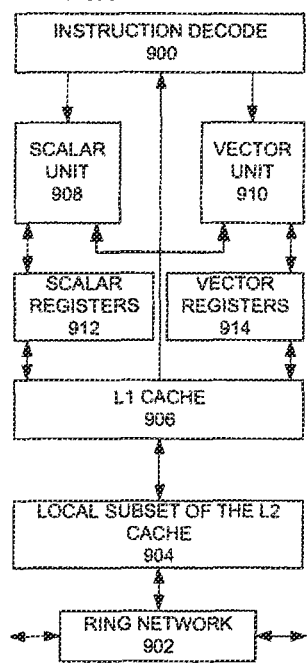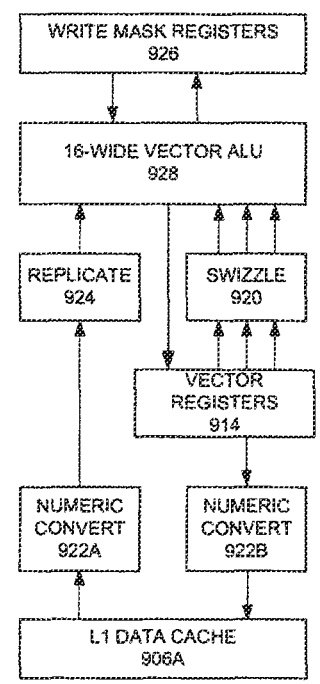

SMS4 ACCELERATION PROCESSORS, METHODS, SYSTEMS, AND INSTRUCTIONS

BACKGROUND

1. Technical Field

Embodiments described herein generally relate to processors. In particular, embodiments described herein generally relate to performing cryptography in processors.

2. Background Information

Cryptology is a technology often used to protect information (e.g., which is desired to be kept confidential or secret) in computer systems and other electronic devices. Cryptology generally involves using an algorithm (e.g., an elaborate mathematical cryptographic algorithm) and a cryptographic key (e.g., a string of bits) to protect the information. For example, encryption (sometimes referred to as cipher) may be performed in which a series of transformations or operations according to the cryptographic algorithm are performed on input data to be encrypted (e.g., a string of bits representing text, numbers, or other plaintext) using an encryption key to produce an output encrypted data. The encrypted data is also sometimes referred to as cipher text or cipher data. The encrypted data is generally unintelligible. It is generally not possible, or at least not practically feasible, to determine the unencrypted plaintext data from the encrypted data, without knowing the encryption key. If the cryptographic key is known, decryption (sometimes referred to as inverse cipher) may be performed on the encrypted data to reproduce the corresponding plaintext or unencrypted data. Commonly, the transformations or operations performed during decryption are substantially the reverse of the operations that were performed during encryption.

One known cryptographic algorithm is SMS4. SMS4 is a cryptographic algorithm promoted by the Chinese government for use in wireless networks. The SMS4 cryptographic algorithm is based on a block cipher. The input data, output data, and cryptographic key are each 128-bits. Block encryption and decryption are each performed through thirty-two rounds. Encryption and decryption have substantially the same structure except that the round key schedule for decryption is the reverse (e.g., goes in the opposite order) of the round key schedule for encryption. Further details of the SMS4 cryptographic algorithm, if desired, are available in the document "SMS4 Encryption Algorithm for Wireless Networks," translated and typeset by Whitfield Diffie of SUN MICROSYSTEMS corporation and George Ledin of Sonoma State University, 15 May 2008, Version 1.03.

BRIEF DESCRIPTION OF THE DRAWINGS

The invention may best be understood by referring to the following description and accompanying drawings that are used to illustrate embodiments. In the drawings:

FIG. 3 is a block diagram illustrating an embodiment of an SMS4 encryption or decryption round operation that may be performed in response to an embodiment of a SMS4 encryption or decryption round instruction.

FIG. 4 is a block diagram illustrating an embodiment of a SMS4 key expansion round operation that may be performed in response to an embodiment of a SMS4 key expansion round instruction.

FIG. 7A is a block diagram of example embodiments of instruction formats for a pair of SMS4 acceleration instruction each to perform one of encryption/decryption and key expansion.

FIG. 7B is a block diagram of an example embodiment of an instruction format for an SMS4 acceleration instruction operable to perform encryption/decryption or key expansion and having a selector field to select whether encryption/decryption or key expansion is to be performed.

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention.

FIG. 9A is a block diagram of a single processor core, along with its connection to the on-die interconnect network and with its local subset of the Level 2 (L2) cache, according to embodiments of the invention.

FIG. 9B is an expanded view of part of the processor core in FIG. 9A according to embodiments of the invention.

DETAILED DESCRIPTION OF EMBODIMENTS

Figure 1:
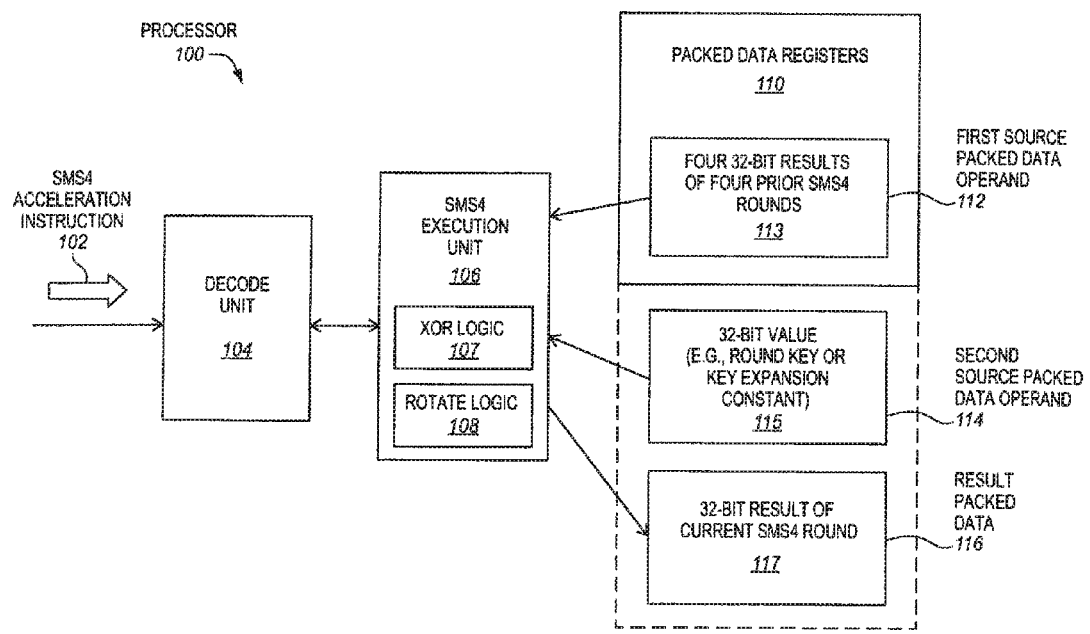
FIG. 1 is a block diagram of an embodiment of a processor operable to perform an embodiment of SMS4 acceleration instruction.

Disclosed herein are SMS4 acceleration instructions, processors to execute the SMS4 acceleration instructions, methods performed by the processors when processing or executing the SMS4 acceleration instructions, and systems incorporating one or more processors to process or execute the SMS4 acceleration instructions. In the following description, numerous specific details are set forth (e.g., specific instruction operations, data formats, arrangements of data within operands, processor configurations, microarchitectural details, sequences of operations, etc.). However, embodiments may be practiced without these specific details. In other instances, well-known circuits, structures and techniques have not been shown in detail to avoid obscuring the understanding of the description.

One challenge is that implementing the SMS4 cryptographic algorithm generally tends to be computationally intensive. Dedicated special-purpose hardware, such as field programmable gate arrays (FPGAs) or application specific integrated circuits (ASICs), are commonly used. However, the use of such dedicated special-purpose hardware tends to have certain drawbacks. It is also possible to implement the SMS4 cryptographic algorithm in software. However, such software implementations generally tend to have poor performance due in part to the SMS4 cryptography algorithm involving a large number of operations that need to be performed. This generally translated into a correspondingly large number of instructions that need to be executed, which generally tends to limit overall performance. Disclosed herein are embodiments of SMS4 acceleration instructions that may be used to accelerate implementations of the SMS4 cryptographic algorithm and/or provide improved performance.

To further illustrate certain concepts, a brief description of the SMS4 cryptographic algorithm will be provided. During encryption and decryption, the SMS4 algorithm uses a round function (F). The round function (F) of the SMS4 algorithm is shown in Equation 1:

$$X_{i+4} = F(X_i, X_{i+1}, X_{i+2}, X_{i+3}, rk_i)$$
$$= X_i \text{ XOR } T(X_{i+1} \text{ XOR } X_{i+2} \text{ XOR } X_{i+3} \text{ XOR } rk_i)$$

Equation 1

Initially, a 128-bit input block (e.g., 128-bits of plaintext data to be encrypted) may be designated as four 32-bit elements ($X_0, X_1, X_2, X_3$). These elements may be arranged in big endian order. The symbol "XOR" represents a bitwise exclusive OR (XOR) operation performed on 32-bit values. The term $rk_i$ represents a 32-bit round key for the i-th round. During the first round a 32-bit result $X_4$ may be determined by evaluating $F(X_0, X_1, X_2, X_3, rk_0)$. The round function (F) is used to perform thirty-two rounds (e.g., for i=0, 1, . . . , 31). The result of the thirty-two rounds provides 128-bits of encrypted data corresponding to the 128-bit input block. As will be explained further below, in some embodiments, a single SMS4 acceleration instruction may evaluate all, or at least substantially all, of one round function (F) to generate a result of a single round during encryption and/or decryption.

Notice that Equation 1 has a "mixer-substitution" function T(x). The mixer-substitution function T(x) generates a 32-bit output from a 32-bits input. The mixer-substitution function T(x) includes two substitution functions as shown in Equation 2:

$$T(x) = L(\tau(x))$$

Equation 2

This equation shows that the mixer-substitution function T(x) involves both a "non-linear substitution" function $\tau(x)$ and also a "linear substitution" function L(.).

The non-linear substitution function T(x) may apply four substitution boxes (Sboxes) to the value x. In particular, the $\tau(x)$ function may break the 32-bit value x into four 8-bit segments $a_0, a_1, a_2,$ and $a_3$. Then, each of these 8-bit segments $a_0, a_1, a_2,$ and $a_3$ may be passed through an Sbox. The Sbox may take the 8-bit segment as an input, perform a non-linear substitution on the input 8-bit segment to generate a replacement or substitute 8-bit segment, and output the replacement or substitute 8-bit segment. By way of example, the Sbox may be implemented as a fixed lookup table. The input 8-bit segment or input byte may be used to lookup the corresponding output 8-bit segment or output byte in the lookup table. For example, one part of the input byte may select a row, another part of the input byte may select a column, and the value at the selected row and column may represent the output byte. The four 8-bit output segments may then be concatenated to produce a 32-bit value designated as B. The 32-bit value B may also be designated as four 8-bit concatenated segments ($b_0, b_1, b_2, b_3$). Equation 3 represents the operation of the non-linear substitution function $\tau(x)$:

$$B = (b_0, b_1, b_2, b_3)$$
$$= \tau(x) = (Sbox(a_0), Sbox(a_1), Sbox(a_2), Sbox(a_3))$$

Equation 3

As shown in Equation 2 above, the linear substitution function L(B) may be performed on the 32-bit result of the non-linear substitution function $\tau(x)$. The evaluation of the linear substitution function L(B) may produce a 32-bit value C. The linear substitution function L(B), which is used for encryption and/or decryption, is shown in Equation 4:

$$C = L(B) = B \text{ XOR}(B <<< 2) \text{XOR}(B <<< 10)$$
$$\text{XOR}(B <<< 18) \text{XOR}(B <<< 24)$$

Equation 4

In the above expression, the symbol "<<<i" represents a left rotate or "circular shift" of a 32-bit value with i-bits rotated or "shifted" to the left.

During encryption, the round function (F) given by Equation 1 may be performed in thirty-two rounds (i=0, 1, . . . , 31). After these thirty-two rounds, the encrypted or ciphertext value of the plaintext 128-bit input block ($X_0, X_1, X_2, X_3$) may be designated as ($Y_0, Y_1, Y_2, Y_3$). ($Y_0, Y_1, Y_2, Y_3$) is equal to the reverse substitution of ($X_{32}, X_{33}, X_{34}, X_{35}$) which may be designated as ($X_{35}, X_{34}, X_{33}, X_{32}$).

To perform decryption, a block may be decrypted by using the same round function (F) given by Equation 1, and reversing the order is which the round keys ($rk_i$) are used. The algorithm's encryption and decryption methods have substantially the same structure, except the order in which the round keys are used may be reversed. The key order for encryption may be first $rk_0$, then $rk_1, \ldots,$ and finally $rk_{31}$. In contrast, the key order for decryption may be first $rk_{31}$, then $rk_{30}, \ldots,$ and finally $rk_0$.

Another part of the SMS4 algorithm is key expansion or key generation. The thirty-two round keys ($rk_0, rk_1, \ldots, rk_{31}$) may be derived from the 128-bit encryption key "MK", a 128 bit system parameter "FK", and thirty-two key generation constants ($CK_0, CK_1, \ldots, CK_{31}$). That is, an expanded set of keys or round keys may be generated from the encryption key, the system parameter, and the constants. The round keys ($rk_i$) may be input to the corresponding rounds (e.g., into the F function shown in Equation 1).

The key expansion proceeds as follows. The 128-bit encryption key MK may be represented as four 32-bit segments ($MK_0, MK_1, MK_2, MK_3$). The system parameter FK may also be represented as four 32-bit segments. In hexadecimal notation, these system parameter segments may be $FK_0$=(a3b1bac6), $FK_1$=(56aa3350), $FK_2$=(677d9197), and $FK_3$=(b27022dc). Initially, four 32-bit segments ($K_0, K_1, K_2, K_3$) may calculated with Equation 5:

$$(K_0, K_1, K_2, K_3) = (MK_0 \text{ XOR } FK_0, MK_1 \text{ XOR } FK_1,$$
$$MK_2 \text{ XOR } FK_2, MK_3 \text{ XOR } FK_3)$$

Equation 5

The thirty-two round keys ($rk_i$) may then be generated using the key expansion function (F') given by Equation 6:

$$rk_i = K_{i+4} = F'(K_i, K_{i+1}, K_{i+2} < K_{i+3}, CK_i)$$
$$= K_i \text{ XOR } T'(K_{i+1} \text{ XOR } K_{i+2} \text{ XOR } K_{i+3} \text{ XOR } CK_i)$$

Equation 6

Equation 6 may be evaluated to generate a result of one round of key expansion, which is in fact a round key ($rk_i$). As will be explained further below, in some embodiments, a single SMS4 acceleration instruction may evaluate all, or at least substantially all, of one key expansion round function (F') to generate a result of a single round during key expansion, which may represent a round key.

Notice that the key expansion function (F') of Equation 6 is similar to the round function (F) of Equation 1, except that the key expansion function (F') has a slightly different "mixer substitution" function T'(x) than the mixer substitution function T(x) shown by Equation 2 above. In particular, the T'(x) function uses a different "linear substitution" function L'(.) which is different than the linear substitution function L(.) shown above in Equation 4. The linear substitution function L'(B) for the different key expansion round function (F') is shown in Equation 7:

$$L'(B) = B \text{ XOR}(B <<< 13) \text{XOR}(B <<< 23)$$

Equation 7

As can be seen by comparing Equation 4 with Equation 7, the slightly different linear substitution function L'(B) uses different rotation amounts, has two fewer XOR operations, and has two fewer rotation operations. This is the major difference between the key expansion function (F') of Equation 6 and the round function (F) of Equation 1.

As can be readily seen, conventionally, without the SMS4 acceleration instructions disclosed herein, implementing the SMS4 algorithm may tend to involve a large number of different operations. Commonly, each round may take from several to many instructions. For example, conventionally it is possible that a separate instruction may be used for each of the XOR operations and for each of the rotate operations described above. Additional instructions may potentially be needed to move or rearrange data, or the like, depending on the particular implementation. In addition, there are thirty-two rounds for encryption/decryption and key expansion also involves thirty-two rounds. As a result, the performance of implementing the SMS4 algorithm in software generally tends to be poor due in part to the number of instructions that need to be executed.

The embodiments of the SMS4 acceleration instructions disclosed herein may help to accelerate implementations of the SMS4 cryptographic algorithm and provide improved performance. In some embodiments, a single SMS4 acceleration instruction may evaluate all, or at least substantially all, of one round function (F), for example as expressed by Equations 1-4 above, to generate a result of a single round during encryption and/or decryption. In other embodiments, a single SMS4 acceleration instruction may evaluate all, or at least substantially all, of one slightly different key expansion round function (F'), for example as expressed by Equations 6, 2, 3, and 7 above, to generate a result of a single round during key expansion (e.g., to generate a round key). In some embodiments, due in part to the similarity between Equation 1 and Equation 6, except for the differences in the linear substation functions L(.) and L'(.), a single instruction may be used either for encryption/decryption or key generation. For example, the single instruction may specify (e.g., have an immediate to specify, a bit to specify, etc.) whether a round of encryption or decryption is to be performed (e.g., using Equations 1-4), or whether a round of key expansion is to be performed (e.g., using Equations 6, 2, 3, and 7). Alternatively, one instruction (e.g., one opcode) may optionally be provided for encryption and decryption and another instruction (e.g., another different opcode) may optionally be provided for key expansion. Advantageously, such an SMS4 acceleration instruction(s) may tend to significantly improve performance of implementing the SMS4 algorithm.

FIG. 1 is a block diagram of an embodiment of a processor 100 operable to perform an embodiment of SMS4 acceleration instruction 102. In some embodiments, the processor may be a general-purpose processor (e.g., of the type commonly used in desktop, laptop, or other computers). Alternatively, the processor may be a special-purpose processor. Examples of suitable special-purpose processors include, but are not limited to, cryptographic processors, cryptographic co-processors, communications processors, network processors, graphics processors, co-processors, embedded processors, digital signal processors (DSPs), to name just a few examples. The processor may be any of various complex instruction set computing (CISC) processors, various reduced instruction set computing (RISC) processors, various very long instruction word (VLIW) processors, various hybrids thereof, or other types of processors.

During operation, the processor 100 may receive the SMS4 acceleration instruction 102. The SMS4 acceleration instruction may be received from an instruction fetch unit, an instruction queue, or the like. The SMS4 acceleration instruction may represent a macroinstruction, assembly language instruction, machine code instruction, or other instruction or control signal of an instruction set of the processor. In some embodiments, the instruction may indicate whether a round of key expansion is to be performed or whether a round of cipher/cryption (e.g., encryption or decryption) is to be performed. In some embodiments, separate opcodes or at least separate instructions may be provided for key expansion and cipher/cryption (e.g., encryption or decryption). In other embodiments, a same instruction (e.g., a same opcode) may be used for both key expansion and cipher/cryption, and the instruction may have one or more bits (e.g., in an immediate or other field) to explicitly specify whether the current SMS4 round is an SMS4 key expansion round or an SMS4 cipher round.

In some embodiments, the SMS4 acceleration instruction may explicitly specify (e.g., through one or more fields or a set of bits), or otherwise indicate (e.g., implicitly indicate), one or more source packed data operands 112, 114. The one or more source packed data operands may have four 32-bit results 113 (e.g., $W_i$, $W_{i+2}$, $W_{i+3}$) of four prior SMS4 rounds (e.g., i, i+1, i+2, i+3). $W_i$, $W_{i+1}$, and the like, are used herein to generically represent either a 32-bit result of an encryption or decryption round (e.g., $X_i$, $X_{i+1}$, and the like) or a 32-bit result of a key expansion round (e.g., $K_i$, $K_{i+1}$, and the like). By way of example, in the case of encryption and/or decryption, the four 32-bit results 113 may represent four results of four evaluations of the round function (F), for example as expressed by Equation 1, in four immediately prior rounds i, i+1, i+2, and i+3, to generate the four 32-bit results $X_i$, $X_{i+1}$, $X_{i+2}$, and $X_{i+3}$. Alternatively, in the case of key expansion, the four 32-bit results 113 may represent four results of four evaluations of the slightly different round function (F'), for example as expressed by Equation 6, in four immediately prior rounds i, i+1, i+2, and i+3, to generate the four 32-bit results $K_i$, $K_{i+1}$, $K_{i+2}$, and $K_{i+3}$. Recall that the round function (F') uses the linear substitution function L'(x), which is slightly different than the linear function L(x) used by the round function (F).

Referring again to FIG. 1, the one or more source operands may also have a 32-bit value 114. By way of example, in the case of encryption and/or decryption, the 32-bit value 114 may represent a round key (e.g., the round key $rk_j$) to be input to an evaluation of the current round of a round function (F), for example as expressed by Equation 1. Alternatively, in the case of key expansion, the 32-bit value 114 may represent a key expansion constant (e.g., $CK_i$) to be input to an evaluation of the current round of the slightly different round function (F'), for example as expressed by Equation 6.

As shown, in some embodiments, the four 32-bit results 113 of the four prior SMS4 rounds may optionally be stored in a first source packed data operand 112, although this is not required. As will be discussed further below, storing all of these results in a same packed data operand may tend to offer certain efficiencies or advantages from an overall algorithmic perspective, due in part to more efficient management of these results from one round to the next and/or avoiding certain data rearrangement operations. As further shown, in some embodiments, the 32-bit value 114 may optionally be stored in a second source packed data operand 114, although this is not required. Alternatively, in other embodiments, the four 32-bit results 113 and the 32-bit value 114 may be rearranged variously within the one or more source operands. For example, the four 32-bit results 113 may optionally be provided via multiple source operands in packed registers, scalar registers (e.g., general-purpose registers), memory locations, or other storage locations. As another example, the four 32-bit results 113 and the 32-bit value 114 may optionally be provided in a same single 256-bit source packed data operand. As yet another example, all of these values may be provided, and rearranged variously within, two 128-bit source packed data operands. As a still further example, the 32-bit value 114 may optionally be stored in an unpacked format in a general-purpose register, memory location, or other storage location. Although there are certain efficiencies or advantages to certain arrangements, as long as these values are provided in some way by the one or more source operands, various different rearrangements are possible, as will be appreciated by those skilled in the art and having the benefit of the present disclosure. In certain embodiments, the first and second source packed data operands 112, 114 may optionally specify the information shown or described for any of FIGS. 3-4, or other information described elsewhere herein.

Referring again to FIG. 1, the processor includes a decode unit or decoder 104. The decode unit may receive and decode the SMS4 acceleration instruction. The decode unit may output one or more microinstructions, micro-operations, microcode entry points, decoded instructions or control signals, or other relatively lower-level instructions or control signals that reflect, represent, and/or are derived from the SMS4 acceleration instruction. The one or more relatively lower-level instructions or control signals may implement the relatively higher-level SMS4 acceleration instruction through one or more relatively lower-level (e.g., circuit-level or hardware-level) operations. In some embodiments, the decode unit may include one or more input structures (e.g., port(s), interconnect(s), an interface) to receive the instruction, an instruction recognition logic coupled with the input structure(s) to recognize the instruction, a decode logic coupled with the recognition logic to decode the instruction into the one or more corresponding lower-level instructions or control signals, and one or more output structures (e.g., port(s), interconnect(s), an interface) coupled with the decode logic to output the one or more corresponding lower level instructions or control signals. The recognition logic and the decode logic may be implemented using various different mechanisms including, but not limited to, microcode read only memories (ROMs), look-up tables, hardware implementations, programmable logic arrays (PLAs), and other mechanisms used to implement decode units known in the art.

In some embodiments, instead of the SMS4 acceleration instruction being provided directly to the decode unit, an instruction emulator, translator, morpher, interpreter, or other instruction conversion module may optionally be used. Various different types of instruction conversion modules are known in the arts and may be implemented in software, hardware, firmware, or a combination thereof. In some embodiments, the instruction conversion module may be located outside the instruction processing processor, such as, for example, on a separate die and/or in a memory (e.g., as a static, dynamic, or runtime instruction emulation module). By way of example, the instruction conversion module may receive the SMS4 acceleration instruction which may be of a first instruction set and may emulate, translate, morph, interpret, or otherwise convert the SMS4 acceleration instruction into one or more corresponding or derived intermediate instructions or control signals which may be of a second different instruction set. The one or more instructions or control signals of the second instruction set may be provided to a decode unit that is operable to decode instructions or control signals of the second instruction set. The decode unit may decode the received one or more instructions or control signals of the second instruction set into one or more lower-level instructions or control signals executable by native hardware of the processor (e.g., one or more execution units).

The processor 100 also includes a set of packed data registers 110. Each of the packed data registers may represent an on-die storage location that is operable to store packed data, vector data, or SIMD data. The packed data registers may represent architecturally-visible registers (e.g., an architectural register file). The architecturally-visible or architectural registers are visible to software and/or a programmer and/or are the registers indicated by instructions of an instruction set of the processor to identify operands. These architectural registers are contrasted to other non-architectural or non-architecturally visible registers in a given microarchitecture (e.g., temporary registers, reorder buffers, retirement registers, etc.). In some embodiments, the first source packed data operand 112 and/or the four 32-bit results 113 of the four immediately prior rounds may optionally be stored in a first packed data register. In some embodiments, the second source packed data operand 114 and/or the 32-bit value 115 may optionally be stored in a second packed data register. Alternatively, memory locations, or other storage locations, may be used for one or more of these. The packed data registers may be implemented in different ways in different microarchitectures using well-known techniques and are not limited to any particular type of circuit. Various different types of registers are suitable. Examples of suitable types of registers include, but are not limited to, dedicated physical registers, dynamically allocated physical registers using register renaming, and combinations thereof.

Referring again to FIG. 1, an SMS4 execution unit 106 is coupled with the decode unit 104 and the packed data registers 110. For simplicity, the SMS4 execution unit may also be referred to herein simply as an execution unit. The execution unit may receive the one or more decoded or otherwise converted instructions or control signals that represent and/or are derived from the SMS4 acceleration instruction 102. The execution unit may also receive the four 32-bit results 113 of four prior SMS4 rounds, and the 32-bit value 115. The execution unit may be operable in response to and/or as a result of the SMS4 acceleration instruction (e.g., in response to one or more instructions or control signals decoded from the instruction) to store a 32-bit result 117 of a current SMS4 round. By way of example, in the case of encryption and/or decryption, the 32-bit result 117 of the current SMS4 round may represent a result of an evaluation of the round function (F), for example as expressed by Equation 1, to generate the result $X_{i+4}$. Alternatively, in the case of key expansion, the 32-bit result 117 of the current SMS4 round may represent a result of an evaluation of the slightly different round function (F'), for example as expressed by Equation 6, which uses the L'(x) linear substitution instead of the L(x) function, to generate the result $K_{i+4}$. In some embodiments, the execution unit may store a result that may include any of those of shown or described for FIGS. 3-4, or other results described herein, although the scope of the invention is not so limited.

In some embodiments, the 32-bit result 117 may be stored in a destination storage location that may be explicitly specified or otherwise indicated (e.g., implicitly indicated) by the instruction. By way of example, the destination storage location may be a packed data register, a memory location, a general-purpose register, or other storage location. In some embodiments, the destination storage location may optionally be a same storage location (e.g., a packed data register) as was used for a source operand, although this is not required. For example, the instruction may implicitly indicated that the storage location specified for the source operand be implicitly also used as a destination storage location, although this is not required. Advantageously, the SMS4 acceleration instruction may help to significantly increase the speed, efficiency, and/or performance of implementing the SMS4 algorithm (e.g., by avoiding an otherwise high instruction count and complexity through conventional software approaches).

The SMS4 execution unit and/or the processor may include specific or particular cryptographic circuitry or other logic (e.g., transistors, integrated circuitry, or other hardware potentially combined with firmware (e.g., instructions stored in non-volatile memory) and/or software) that is operable to perform the SMS4 acceleration instruction and/or store the result in response to the SMS4 acceleration instruction (e.g., in response to one or more instructions or control signals decoded from the SMS4 acceleration instruction). In some embodiments, the execution unit may include one or more input structures (e.g., port(s), interconnect(s), an interface) to receive source operands, circuitry and/or logic coupled with the input structure(s) to process the source operands and generate the result operand, and one or more output structures (e.g., port(s), interconnect(s), an interface) coupled with the circuitry and/or logic to output the result operand. In some embodiments, the execution unit may include crypto logic, such as, for example, round function (F) evaluation circuitry or other logic 107 and/or key expansion round function (F') circuitry or other logic 108. Each of the logics 107, 108 may include rotate circuitry or other logic, XOR circuitry or other logic, etc. The logics 107, 108 may also include Sbox logic consistent with the SMS4 algorithm. In some embodiments, the execution unit may include the circuitry or other logic shown or described for any of FIGS. 5-6, although the scope of the invention is not so limited.

To avoid obscuring the description, a relatively simple processor 100 has been shown and described. The processor may optionally include other well-known components. Possible examples of such components include, but are not limited to, an instruction fetch unit, instruction and data caches, second or higher level caches, out-of-order execution logic, an instruction scheduling unit, a register renaming unit, a retirement unit, a bus interface unit, instruction and data translation lookaside buffers, prefetch buffers, microinstruction queues, microinstruction sequencers, other components included in processors, and various combinations thereof. Numerous different combinations and configurations of such components are suitable. Embodiments may be included in processors have multiple cores, logical processors, or execution engines at least one of which has a decode unit and an execution unit to perform an embodiment of a SMS4 acceleration instruction.

Figure 2:
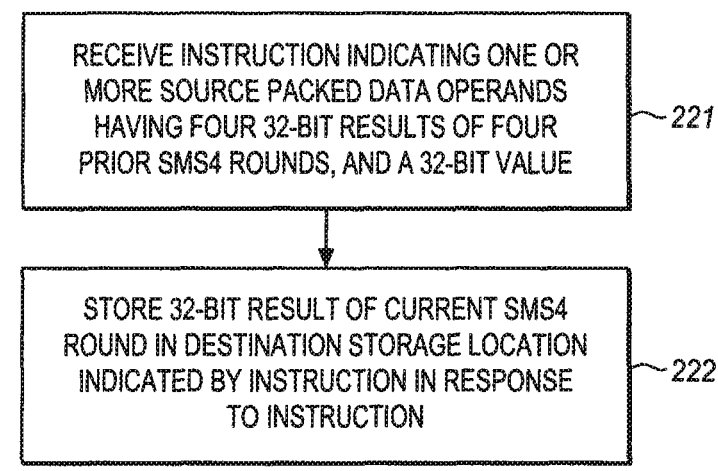
FIG. 2 is a block flow diagram of an embodiment of a method of performing an embodiment of a SMS4 acceleration instruction.

FIG. 2 is a block flow diagram of an embodiment of a method 220 of performing an embodiment of a SMS4 acceleration instruction. In various embodiments, the method may be performed by a processor, instruction processing apparatus, or other digital logic device. In some embodiments, the operations and/or method of FIG. 2 may be performed by and/or within the processor of FIG. 1. The components, features, and specific optional details described herein for the processor of FIG. 1 also optionally apply to the operations and/or method of FIG. 2. Alternatively, the operations and/or method of FIG. 2 may be performed by and/or within a similar or different processor or apparatus. Moreover, the processor of FIG. 1 may perform operations and/or methods the same as, similar to, or different than those of FIG. 2.

The method includes receiving the SMS4 acceleration instruction, at block 221. In various aspects, the instruction may be received at a processor, an instruction processing apparatus, or a portion thereof (e.g., an instruction fetch unit, a decode unit, a bus interface unit, etc.). In various aspects, the instruction may be received from an off-die source (e.g., from memory, interconnect, etc.), or from an on-die source (e.g., from an instruction cache, instruction queue, etc.). The SMS4 acceleration instruction may specify or otherwise indicate one or more source packed data operands. The one or more source packed data operands may have four 32-bit results (e.g., $W_i$, $W_{i+1}$, $W_{i+2}$, $W_{i+3}$) of four prior SMS4 rounds (e.g., i, i+1, i+2, i+3), and a 32-bit value (e.g., in some embodiments a round key $rk_i$, or in other embodiments a key expansion constant $CK_i$).

A 32-bit result of a current SMS4 round may be stored in a destination storage location in response to the instruction, at block 222. The destination storage location may be explicitly specified or otherwise indicated (e.g., implicitly indicted) by the instruction. Representatively, an execution unit, instruction processing apparatus, or processor may perform the instruction and store the result. In some embodiments, the sources and/or result may be any of those shown or described for any of FIGS. 3-4, or other results described elsewhere herein.

The illustrated method involves architectural operations (e.g., those visible from a software perspective). In other embodiments, the method may optionally include one or more microarchitectural operations. By way of example, the instruction may be fetched, decoded, source operands may be accessed, an execution unit may perform microarchitectural operations to implement the instruction, etc. In some embodiments, the microarchitectural operations to implement the instruction may optionally include evaluating an (F) function, an (F') function, performing Sbox lookups, performing XOR operations, performing rotate operations, etc. In some embodiments, the microarchitectural operations to implement the instruction may optionally include any of those shown or described for any of FIGS. 5-6 or Equations 1-7.

FIG. 3 is a block diagram illustrating an embodiment of an SMS4 encryption or decryption round operation 330 that may be performed in response to an embodiment of a SMS4 encryption or decryption round instruction. In the illustrated embodiment, the instruction may specify or otherwise indicate a first source packed data operand 312 and may specify or otherwise indicate a second source packed data operand 314. In various embodiments, the source operands may be stored in packed data registers, memory locations, or other storage locations. As shown, in some embodiments the instruction may indicate as source operands only these two source operands.

In the illustrated embodiment, each of the first and second source packed data operands 312, 314 is a 128-bit operand that has four 32-bit data elements. In the description of the SMS4 algorithm, these 32-bit data elements are also referred to as "words." In the illustrated embodiment, the first source packed data operand 312 optionally has four 32-bit results of four prior SMS4 encryption or decryption rounds. In the illustration, these four 32-bit results of the four prior SMS4 encryption or decryption rounds are labeled $X_i$, $X_{i+1}$, $X_{i+2}$, and $X_{i+3}$. Including all of the four 32-bit results of the four prior SMS4 encryption or decryption rounds in the same source packed data operand may offer certain efficiencies or advantages from an overall algorithmic perspective, but is not required. In other embodiments, these four 32-bit results may be provided in two or more source operands.

As shown, in some embodiments, the four 32-bit results of the four prior SMS4 encryption or decryption rounds may optionally be arranged according to round order (e.g., according to ascending or descending round order). This may tend to offer certain efficiencies or advantages from an overall algorithmic perspective, but is not required. For example, in the illustration, a first 32-bit result of an immediately prior SMS4 round ($X_{i+3}$) is stored in bits [31:0], a second 32-bit result of a second prior SMS4 round ($X_{i+2}$) is stored in bits [63:32], a third 32-bit result of a third prior SMS4 round ($X_{i+1}$) is stored in bits [95:64], and a fourth 32-bit result of a fourth prior SMS4 round ($X_i$) is stored in bits [127:96]. Notice that in this embodiment the relative age of the round results increases with increasing bit significance in the operand or register (e.g., older round results are stored at relatively more significant bit positions than relatively younger round results), although this is not required. In an alternate embodiment, a reverse order may also optionally be used.

In the illustrated embodiment, the second source packed data operand 314 optionally has a 32-bit round key corresponding to the current SMS4 encryption or decryption round (e.g., to be input to the current round calculations). In the illustration, the 32-bit round key is labeled $rk_i$. In the illustrated embodiment, the 32-bit round key ($rk_i$) is stored in bits [31:0], although in other embodiments it may be stored in other data element positions. Asterisks (*) are used for other data elements of the second source packed data operand not used to store the 32-bit round key to indicate that these data elements are don't care values. They may optionally be zeroed or store values that simply are not used.

Referring again to FIG. 3, a result packed data 316 may be generated and stored in a destination storage location in response to the instruction/operation. The destination storage location may be specified or otherwise indicated by the instruction. In various embodiments, the destination storage location may be a packed data register, a memory location, or other storage location. In some embodiments, the result packed data 316 may include a 32-bit result of the current SMS4 encryption or decryption round 332. In the illustrated embodiment, the 32-bit result of the current SMS4 encryption or decryption round is designated as $X_{i+4}$.

As shown, in some embodiments, in addition to the 32-bit result ($X_{i+4}$) of the current SMS4 encryption or decryption round, the result packed data may also optionally include three 32-bit results from three immediately prior SMS4 encryption or decryption rounds. In the illustrated embodiment these are designed as $X_i$, $X_{i+2}$, and $X_{i+3}$. These three values in the result packed data (e.g., $X_i$, $X_{i+2}$, and $X_{i+3}$) may have the same values as the three corresponding results from the three corresponding immediately prior encryption or decryption rounds as stored in the first source packed data operand. As shown, in some embodiments, the 32-bit result of the current SMS4 encryption or decryption round (e.g., $X_{i+4}$) may optionally be stored in bits [31:0], the first 32-bit result of the immediately prior SMS4 round (e.g., $X_{i+3}$) may optionally be stored in bits [63:32], the second 32-bit result of the second prior SMS4 round (e.g., $X_{i+2}$) may optionally be stored in bits [95:64], and the third 32-bit result of the third prior SMS4 round (e.g., $X_{i+1}$) may optionally be stored in bits [127:96].

Notice that each of $X_{i+1}$, $X_{i+2}$, and $X_{i+3}$ in the result packed data operand has been shifted to the left or most significant bit position by one 32-bit data element position relative to the corresponding value (i.e., $X_{i+1}$, $X_{i+2}$, and $X_{i+3}$) in the first source packed data operand. Advantageously, storing the 32-bit result of the current encryption or decryption round in bits [31:0] and shifting or otherwise storing the three prior results from the three immediately prior encryption or decryption rounds (e.g., $X_{i+1}$, $X_{i+2}$, and $X_{i+3}$) into one 32-bit position to the left, may help to set up the result packed data operand so that it is ready to serve as an input for the next sequential encryption or decryption round. In other words, the result packed data operand may have a one-round updated version of four 32-bit results from four immediately prior SMS4 encryption or decryption rounds. This may offer an efficiency advantage from an overall algorithmic perspective (e.g., avoid needing to perform a data rearrangement), but is not required.

In some embodiments, a destination storage location used to store the result packed data 316 may optionally be a same storage location as was used to store the first source packed data operand 312. For example, the instruction may specify or otherwise indicate a source/destination operand that is to be initially used to store the first source packed data operand and then is implicitly or impliedly to be subsequently reused to store the packed data result (e.g., the packed data result may be written over the first source packed data operand). Alternatively, different storage locations may optionally be used and the three prior 32-bit results (e.g., $X_{i+1}$, $X_{i+2}$, and $X_{i+3}$) may be moved, copied, or otherwise stored in the destination storage location.

FIG. 4 is a block diagram illustrating an embodiment of a SMS4 key expansion round operation 440 that may be performed in response to an embodiment of a SMS4 key expansion round instruction. The key expansion round operation of FIG. 4 has certain similarities to the encryption or decryption round operation of FIG. 3. To avoid obscuring the description, the different and/or additional characteristics for the key expansion round operation of FIG. 4 will primarily be described, without repeating all the optionally similar or common characteristics and details relative to the encryption or decryption round operation of FIG. 3. However, it is to be appreciated that the previously described characteristics and details and possible variations of the encryption or decryption round operation of FIG. 3 may also optionally apply to the key expansion round operation of FIG. 4, unless stated otherwise or otherwise clearly apparent.

In the illustrated embodiment, the instruction may specify or otherwise indicate a first source packed data operand 412 and may specify or otherwise indicate a second source packed data operand 414. In various embodiments, the source operands may be stored in packed data registers, memory locations, or other storage locations. In the illustrated embodiment, each of the first and second source packed data operands 412, 414 is a 128-bit operand that has four 32-bit data elements. In the illustrated embodiment, the first source packed data operand optionally has four 32-bit results of four prior SMS4 key expansion rounds labeled as $K_i$, $K_{i+1}$, $K_{i+2}$, and $K_{i+3}$. In other embodiments, these four 32-bit results may be provided via two or more source operands.

As shown, in some embodiments, the four 32-bit results of the four prior SMS4 key expansion rounds may optionally be arranged according to round order, although this is not required. For example, as shown a first 32-bit result of an immediately prior SMS4 key generation round ($K_{i+3}$) may be stored in bits [31:0], a second 32-bit result of a second prior SMS4 round ($K_{i+2}$) may be stored in bits [63:32], a third 32-bit result of a third prior SMS4 round ($K_{i+1}$) may be stored in bits [95:64], and a fourth 32-bit result of a fourth prior SMS4 round ($K_i$) may be stored in bits [127:96]. In an alternate embodiment, a reverse order may also optionally be used. Also, the four 32-bit results may be arranged variously not according to ascending or decreasing round order, if desired.

Referring again to FIG. 4, the second source packed data operand 414 optionally has a 32-bit key expansion constant, labeled $CK_i$, corresponding to the current SMS4 key expansion round (e.g., to be input to the current round calculations associated with the F' function). The key expansion constant $CK_i$ may be one of the thirty two predetermined $CK_i$ constants defined by the SMS4 algorithm. In the illustrated embodiment, the 32-bit key expansion constant $CK_i$ is stored in bits [31:0], although in other embodiments it may be stored in other data element positions. The key expansion constant $CK_i$ may also optionally be provided via a general-purpose register, memory location, or may be included in place of one of the data elements of the first source packed data operand, to name just a few possible variations.

A result packed data 416 may be generated and stored in a destination storage location in response to the instruction/operation. In various embodiments, the destination storage location may be a packed data register, a memory location, or other storage location. In some embodiments, the result packed data 416 may include a 32-bit result of the current SMS4 key expansion round 432, which in the illustration is designated as $K_{i+4}$. As shown, in some embodiments, in addition to the 32-bit result ($K_{i+4}$) of the current SMS4 round, the result packed data may also optionally include three 32-bit results from three immediately prior SMS4 rounds, which are designed as $K_{i+1}$, $K_{i+2}$, and $K_{i+3}$.

As shown, in some embodiments, the 32-bit result of the current SMS4 round (e.g., $K_{i+4}$) may optionally be stored in bits [31:0], $K_{i+3}$ may optionally be stored in bits [63:32], $K_{i+2}$ may optionally be stored in bits [95:64], and $K_{i+1}$ may optionally be stored in bits [127:96]. Notice that each of $K_{i+1}$, $K_{i+2}$, and $K_{i+3}$ in the result packed data operand has been shifted to the left or most significant bit position by one 32-bit data element position relative to the their corresponding positions in the first source packed data operand. Advantageously, storing the 32-bit result of the current round in bits [31:0] and shifting or otherwise storing the three prior results from the three immediately prior rounds (e.g., $K_{i+1}$, $K_{i+2}$, and $K_{i+3}$) into one 32-bit position to the left, may help to set up the result packed data operand so that it is ready to serve as an input for the next sequential key expansion round. In some embodiments, a destination storage location used to store the result packed data 416 may optionally be a same storage location as was used to store the first source packed data operand 412 (e.g., a source/destination operand may be used), although this is not required.

FIGS. 3-4 show examples of possible arrangements of four 32-bit results of four prior rounds and a 32-bit value in one or more source operands, although the scope of the invention is not limited to these particular arrangements. In other embodiments, these data elements or values may be rearranged variously within the one or more source operands. Both intra-operand and inter-operand rearrangements are possible and contemplated. It is not required to include all four 32-bit results of the four prior rounds in the same source operand, although this may offer certain advantages. Since only one data element (e.g., in the illustrated examples $rk_i$ or $CK_i$) may not fit in the first 128-bit source packed data operand, a 32-bit or 64-bit general purpose register may also be used to store this one extra value, if desired. It is also not required to use two source operands, since a single larger source operand may instead optionally be used to contain all of the requisite values. Conversely, a larger number of smaller registers (e.g., 64-bit registers) may optionally be used if desired. Although some options may offer advantages over others, as long as the needed data values are provided somewhere in the one or more source operands, the data may be routed or moved as needed to perform the relevant calculations and generate the result.

Figure 5:
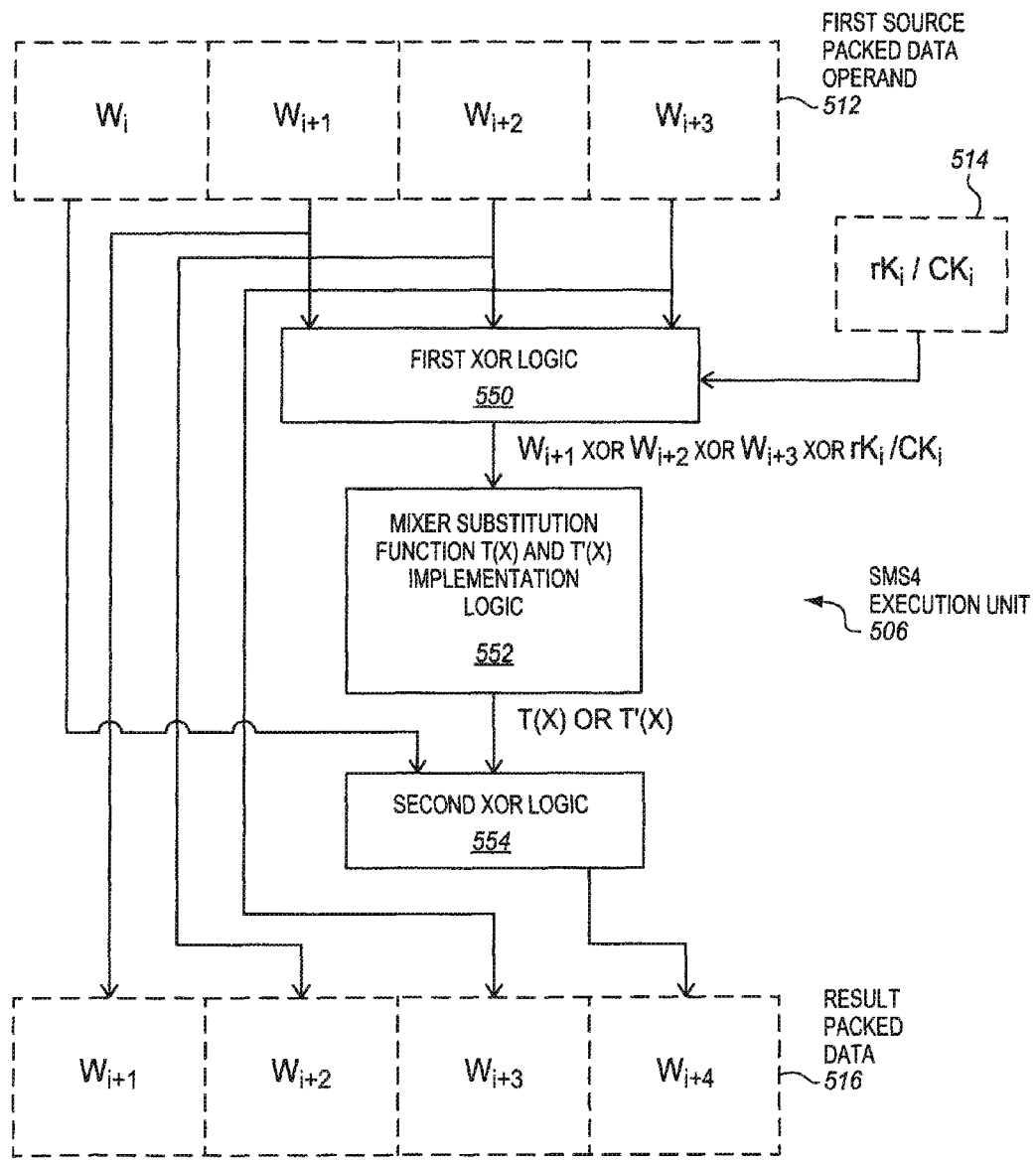
FIG. 5 is a block diagram of an example embodiment of an SMS4 execution unit.

FIG. 5 is a block diagram of an example embodiment of an SMS4 execution unit 506. The execution unit is coupled with a first source packed data operand 512 and a second source operand 514. The first source packed data operand, in this example, has four results of four immediately prior rounds $W_i$, $W_{i+1}$, $W_{i+2}$, $W_{i+3}$. The second source operand, in this example, has either a round key ($rk_i$) in the case of encryption or decryption, or a key expansion constant ($CK_i$) in the case of key expansion. In some embodiments, only one of encryption/decryption or key expansion is supported by the execution unit. In other embodiments, both may be supported and the instruction may either indicate (e.g., through an opcode) or specify (e.g., through an immediate or one or more bits) which is to be performed. The results $W_{i+1}$, $W_{i+2}$, and $W_{i+3}$, and either $rk_i$ or $CK_i$ are provided to a first XOR logic 550. The first XOR logic may output $W_{i+1}$ XOR $W_{i+2}$ XOR $W_{i+3}$ XOR $rk_i/CK_i$ to a mixer substitution function implementation logic 552. The mixer substitution function implementation logic may implement the T(x) and/or T'(x) mixer substitution functions. In some embodiments, only one of these functions may be supported. In other embodiments both of these functions may be supported. The mixer substitution function implementation logic may output a result of T(x) or T'(x) performed on its input. In some embodiments, the instruction may indicate or specify which of T(x) or T'(x) and/or which of L(x) or L'(x) is to be used. The output of the mixer substitution function implementation logic may be input to a second XOR logic 554 along with the result of the fourth prior round $W_1$. The second XOR logic may perform an XOR on the result $W_1$ and the result of T(x) or T'(x) to generate a 32-bit result for the current round ($W_{i+4}$). The 32-bit result $W_{i+4}$, as well as the results from the three immediately prior rounds $W_{i+3}$, $W_{i+2}$, and $W_{i+1}$, may be routed to and stored in a result packed data. The illustrated arrangement of the source and result elements is one possible example, but is not required. As can be readily seen in this example, various other arrangements are also possible through proper routing of the data elements to the intended positions.

Figure 6:
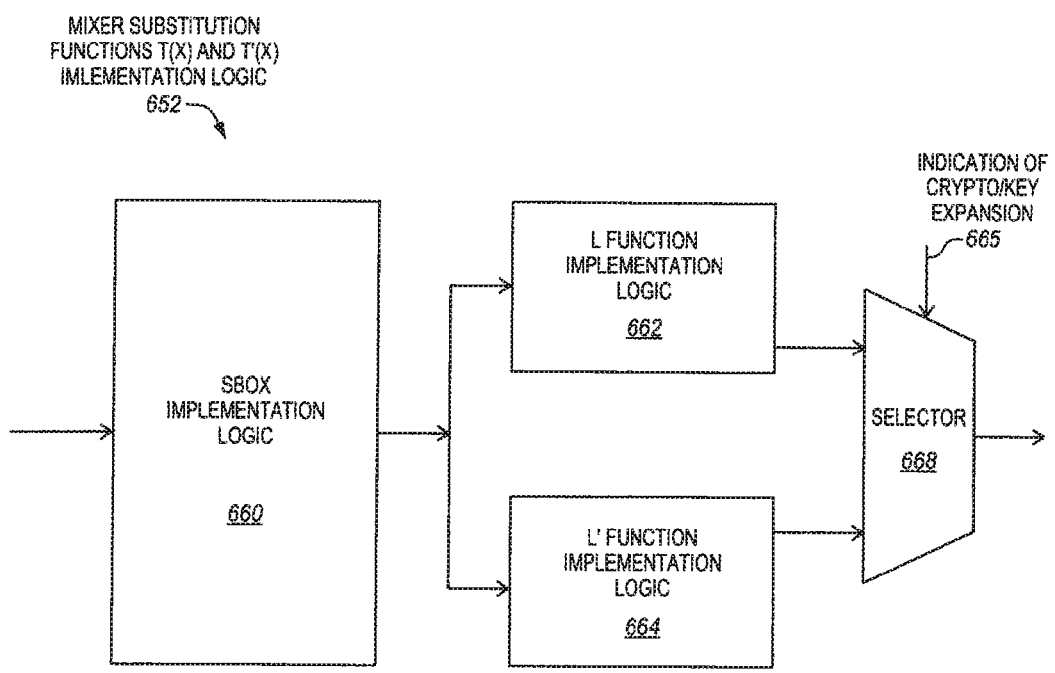
FIG. 6 is a block diagram of an example embodiment of mixer substitution function implementation logic for an SMS4 execution unit.

FIG. 6 is a block diagram of an example embodiment of mixer substitution function implementation logic 652 to implement both a T(x) function and a T'(x) function. The logic 652 is suitable for the logic 552 of FIG. 5. A value (e.g., $W_{i+1}$ XOR $W_{i+2}$ XOR $W_{i+3}$ XOR $rk_i/CK_i$) may be input to Sbox implementation logic 660. The Sbox implementation logic may perform the Sbox substitutions consistent with SMS4. By way of example, the Sbox may be implemented as a hardware lookup table (e.g., a series of multiple input single output multiplexers that select one of the inputs based on an input selection signal derived from an input byte). The output of the Sbox implementation logic may be provided to an L(x) function implementation logic 662 and/or an L'(x) function implementation logic 664. In some embodiments, both may be supported. In such embodiments, the instruction may indicate (e.g., through an opcode) or specify (e.g., through an immediate, one or more bits, etc.) which of the L(x) and L'(x) function implementation logics is to be used. In the illustrated example, it is assumed that both function implementation logics are included and both are used to generate a result. A selector 668 is used to select the output from an appropriate one of the L(x) and L'(x) function implementation logics based on a selector input 665 (e.g., an indication of either encryption/decryption or key expansion derived from the instruction), although the scope of the invention is not so limited.

FIG. 7A is a block diagram of example embodiments of instruction formats 770-1, 770-2 for a pair of SMS4 acceleration instruction each to perform a different one of encryption/decryption and key expansion. An instruction format 770-1 for an SMS4 cryption (e.g., encryption or decryption) acceleration instruction has a first operation code or opcode 771 to identify the type of instruction and/or the type of operation to be performed are for SMS4 cryption (e.g., encryption or decryption) acceleration. Similarly, an instruction format 770-2 for an SMS4 key expansion acceleration instruction has a second, different operation code or opcode 772 to identify the type of instruction and/or the type of operation to be performed are for SMS4 key expansion acceleration. The opcodes may represent a plurality of bits or one or more fields. In the illustrated example, each of the instruction formats also includes a first source specifier 774, a second source specifier 776, and a destination specifier 768, although the scope of the invention is not so limited. By way of example, each of these specifiers may include bits or one or more fields to specify an address of a register, memory location, or other storage location.

FIG. 7B is a block diagram of an example embodiment of an instruction format 780 for a single SMS4 acceleration instruction that is operable to perform both encryption/decryption and key expansion. The format includes an operation code or opcode 781 to identify the type of instruction and/or the type of operation to be performed are for SMS4 acceleration (e.g., inclusive of either cryption or key expansion). The format also has a cryption or key expansion selector field 782 to select whether cryption (e.g., encryption or decryption) or key expansion is to be performed. The selector field may include one or more bits anywhere in the instruction. In some embodiments, the selector field may optionally be provided by an immediate, such as, for example, an 8-bit immediate (IMM8). Alternatively, a 2-bit immediate (IMM2), a 4-bit immediate (IMM4), or some other sized immediate may optionally be used. The immediate may have a bit, or a plurality of bits, to specify or indicate whether cryption or key expansion is to be performed. This may be used to select whether an L(x) linear substitution function or an L'(x) linear substitution function is to be used. For example, this may be used to control the selector in FIG. 6 to select the appropriate output of the L function implementation logic or the L' function implementation logic. The format also includes, in the illustrated example, a first source specifier 774, a second source specifier 776, and a destination specifier 778, although the scope of the invention is not so limited. By way of example, each of these specifiers may include bits or one or more fields to specify an address of a register, memory location, or other storage location.

It is to be appreciated that the formats of FIGS. 7A-7B are just a few illustrative examples. In other embodiments, one or more of the first source specifier, the second source specifier, and the destination specifier (i.e., one of the explicit specifiers) may optionally be implicit to the instruction rather than being explicitly specified. For example, in some embodiments, instead of the destination specifier, a same storage location used for one of the sources may optionally be implicitly or impliedly also understood to be used as the destination. Moreover, alternate embodiments may have fewer or more sources (e.g., depending on whether 256-bit or 64-bit source operands are used). In addition, the illustrated order/arrangement of the fields and is not required, but rather the fields may be rearranged, overlapped, fields need not include contiguous sequences of bits but rather may be composed of non-contiguous or separated bits, etc.

The descriptions here are intended to implement the SMS4 cryptographic algorithm and obtain values that are consistent with the SMS4 cryptographic algorithm as described in official publications. Any possible discrepancies or inconsistencies herein (e.g., due to typographical errors or otherwise) that would lead to hashes different than those described by the standard are unintentional and erroneous. It is to be understood that the official standard in its correct form should be followed. In addition, while the current version of the SMS4 algorithm has been described, it is to be appreciated that embodiments are also applicable to extensions of this standard, derivations of this standard, modifications of this standard, related standards, and the like, which meet the limitations of the claims.

Components, features, and details described for any of FIGS. 3-7 may also optionally be used in any of FIGS. 1-2. Moreover, components, features, and details described herein for any of the processors described herein may also optionally be used in and/or apply to any of the methods described herein, which in embodiments may be performed by and/or with such a processor and/or to any of the systems described herein, which in embodiments may include such a processor.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 performs the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS TECHNOLOGIES corporation of Sunnyvale, Calif.;

the ARM instruction set (with optional additional extensions such as NEON) of ARM HOLDINGS corporation of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
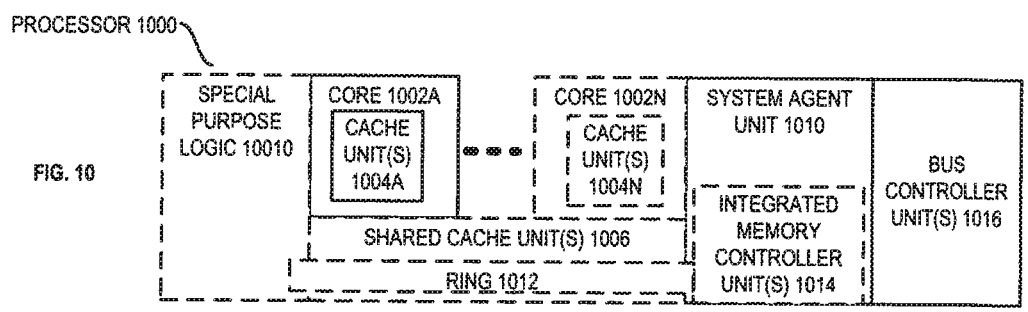
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
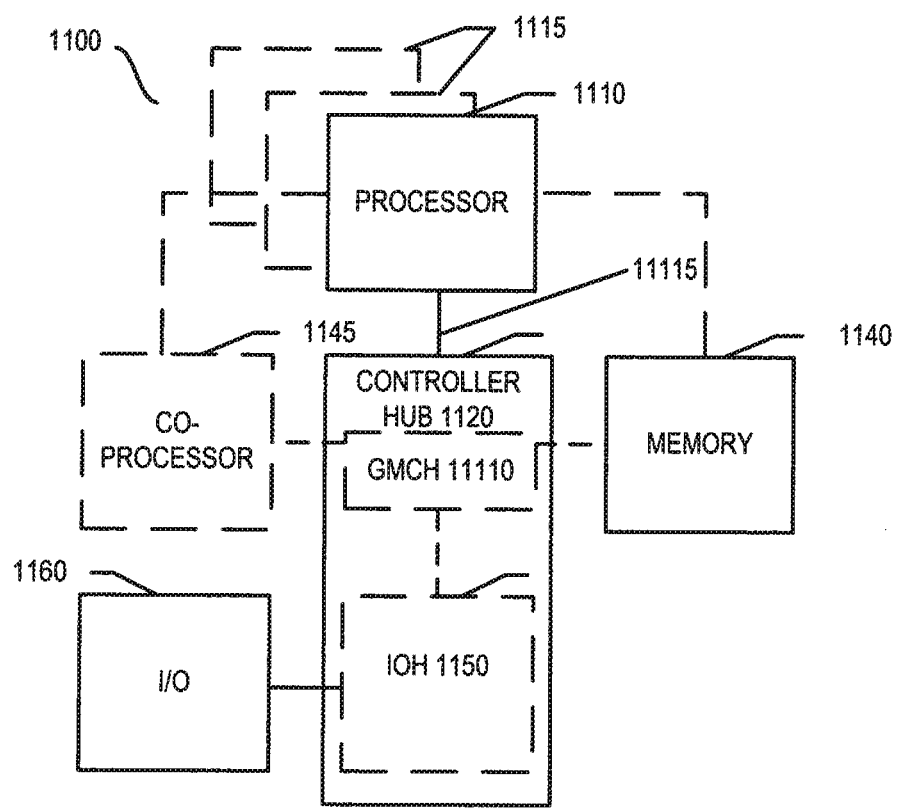
FIG. 11 shown is a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
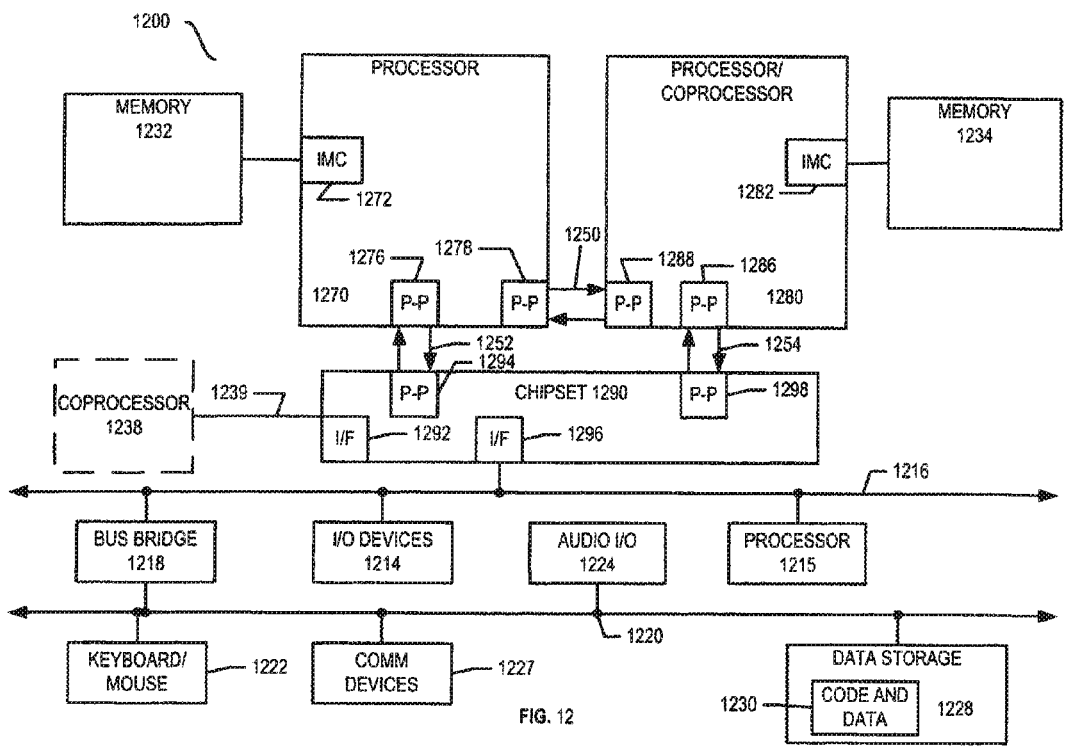
FIG. 12 shown is a block diagram of a first more specific exemplary system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
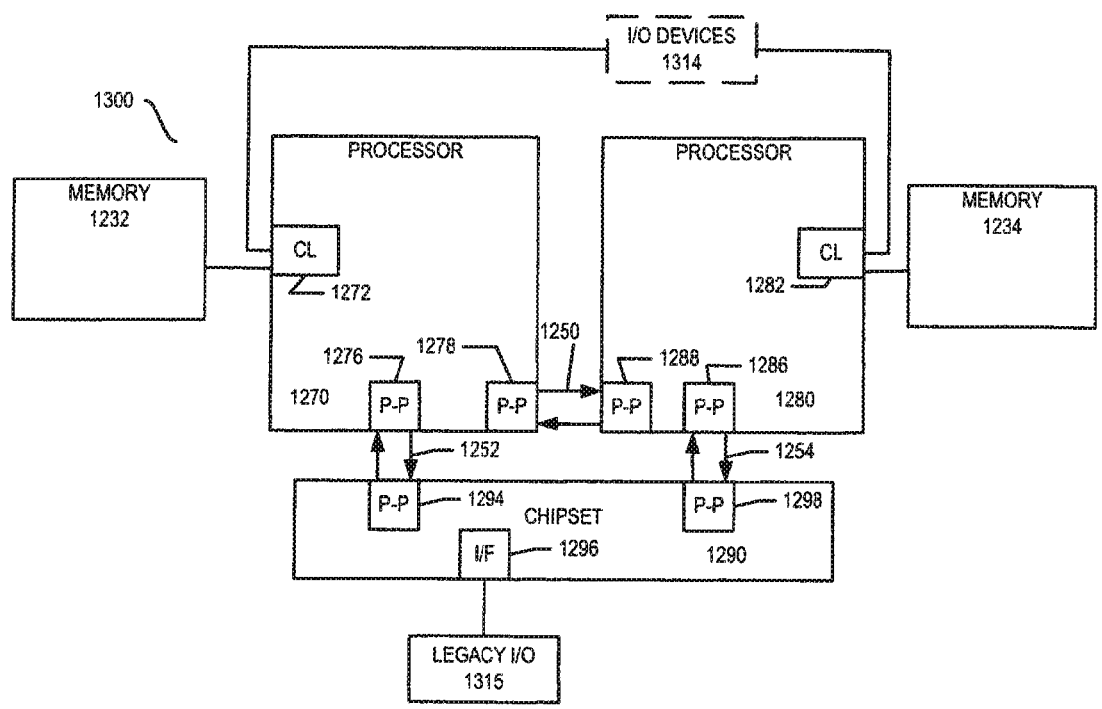
FIG. 13 shown is a block diagram of a second more specific exemplary system in accordance with an embodiment of the present invention.

Referring now to FIG. 13, shown is a block diagram of a second more specific exemplary system 1300 in accordance with an embodiment of the present invention Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
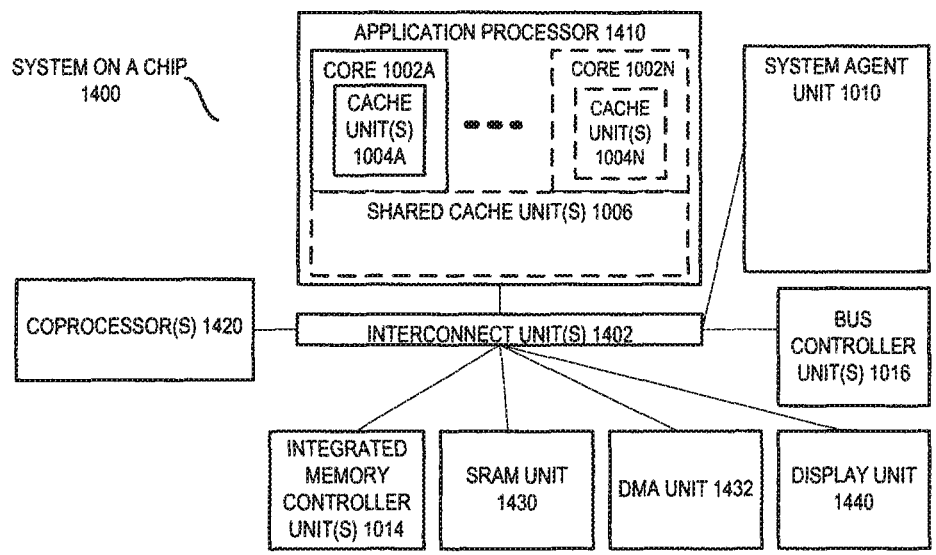
FIG. 14 shown is a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
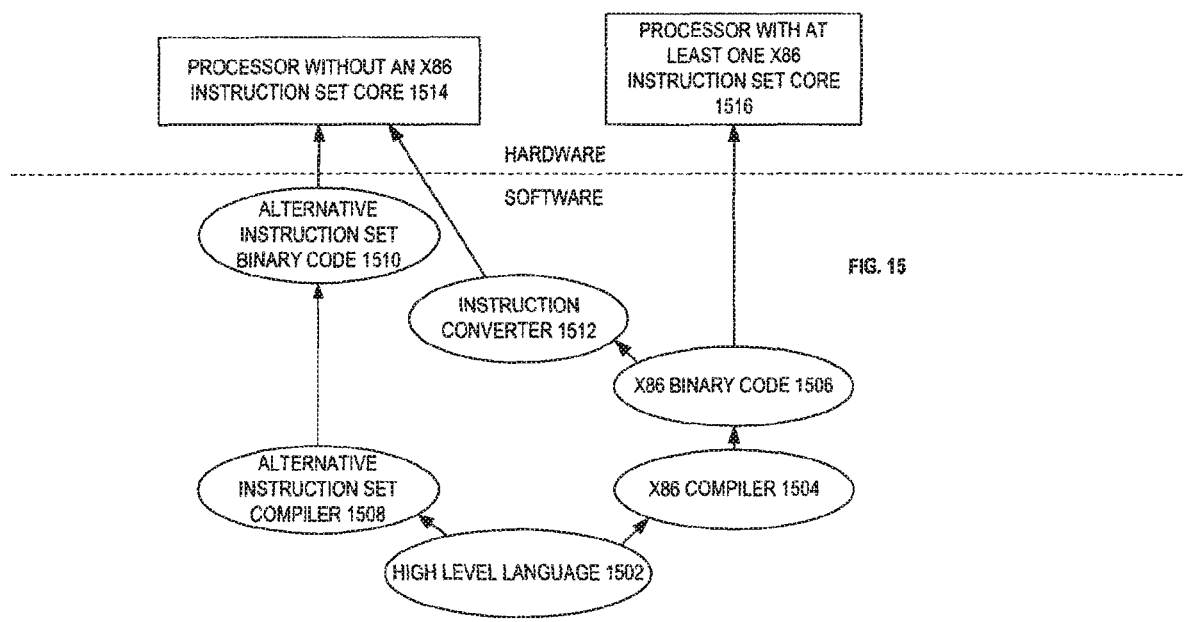
FIG. 15 is a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS TECHNOLOGIES corporation of Sunnyvale, Calif. and/or that execute the ARM instruction set of ARM HOLDINGS corporation of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

In the description and/or claims, the terms "logic," "unit," "module," or "component," may have been used. Each of these terms may be used to refer to hardware, firmware, software, or various combinations thereof. In example embodiments, each of these terms may refer to integrated circuitry, application specific integrated circuits, analog circuits, digital circuits, programmed logic devices, memory devices including instructions, and the like, and various combinations thereof. In some embodiments, these may include at least some hardware (e.g., transistors, gates, other circuitry components, etc.).

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise. In some cases, where multiple components have been shown and described, they may instead optionally be integrated together as a single component. In other cases, where a single component has been shown and described, it may optionally be separated into two or more components.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may provide, for example store, one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, other wireless devices, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor or apparatus that includes a plurality of packed data registers and a decode unit to decode an instruction. The instruction is to indicate one or more source packed data operands. The one or more source packed data operands are to have four 32-bit results of four prior SMS4 rounds, and a 32-bit value. The processor also includes an execution unit coupled with the decode unit and the plurality of the packed data registers. The execution unit, in response to the instruction, is to store a 32-bit result of a current SMS4 round in a destination storage location that is to be indicated by the instruction.

Example 2 includes the processor or apparatus of Example 1 and optionally in which the decode unit is to decode the instruction in which the four 32-bit results are to include four 32-bit results of four prior SMS4 encryption rounds. Also, in which the 32-bit value is to include a 32-bit round key for a current SMS4 encryption round. Also, in which the execution unit is to store the 32-bit result which is to include a 32-bit result of a current SMS4 encryption round.

Example 3 includes the processor or apparatus of Example 1 and optionally in which the decode unit is to decode the instruction in which the four 32-bit results are to include four 32-bit round keys for four prior SMS4 key expansion rounds. Also, in which the 32-bit value is to include a 32-bit constant to be input to a current SMS4 key expansion round. Also, in which the execution unit is to store the 32-bit result which is to include a 32-bit round key of a current SMS4 key expansion round.

Example 4 includes the processor or apparatus of any preceding example and optionally in which the decode unit is to decode the instruction that is to have one or more bits to specify whether the current SMS4 round is an SMS4 key expansion round or an SMS4 encryption or decryption round.

Example 5 includes the processor or apparatus of any preceding example and optionally in which the instruction is to have an immediate having a single bit to specify whether the current SMS4 round is the SMS4 key expansion round or the SMS4 encryption or decryption round.

Example 6 includes the processor or apparatus of any preceding example and optionally in which the decode unit is to decode the instruction that is to indicate a 128-bit source packed data operand that is to have the four 32-bit results of the four prior SMS4 rounds.

Example 7 includes the processor or apparatus of Example 6 and optionally in which the 128-bit source packed data operand is to have the four 32-bit results of the four prior SMS4 rounds arranged according to round order.

Example 8 includes the processor or apparatus of any preceding example and optionally in which the execution unit is to store the 32-bit result of the current SMS4 round in a result packed data that is also to include three of the four 32-bit results from three immediately prior SMS4 rounds of the four prior SMS4 rounds.

Example 9 includes the processor or apparatus of Example 8 and optionally in which the result packed data is to have each of the three 32-bit results from the three immediately prior SMS4 rounds each shifted by one 32-bit position relative to a corresponding bit position in which they appear in a source operand.

Example 10 includes the processor or apparatus of any preceding example and optionally in which the decode unit is to decode the instruction that is to indicate a source packed data operand that is to have, a first 32-bit result of an immediately prior SMS4 round in bits [31:0], a second 32-bit result of a second prior SMS4 round in bits [63:32], a third 32-bit result of a third prior SMS4 round in bits [95:64], and a fourth 32-bit result of a fourth prior SMS4 round in bits [127:96].

Example 11 includes the processor or apparatus of Example 10 and optionally in which the execution unit is to store a result packed data that is to include, the 32-bit result of the current SMS4 round in bits [31:0], the first 32-bit result of the immediately prior SMS4 round in bits [63:32], the second 32-bit result of the second prior SMS4 round in bits [95:64], and the third 32-bit result of the third prior SMS4 round in bits [127:96].

Example 12 is a method in a processor that includes receiving an instruction. The instruction indicates one or more source packed data operands. The one or more source packed data operands have four 32-bit results of four prior SMS4 rounds, and a 32-bit value. The method also includes storing a 32-bit result of a current SMS4 round in a destination storage location in response to the instruction. The destination storage location is indicated by the instruction.

Example 13 includes the method of Example 12 and optionally in which receiving includes receiving the instruction in which the four 32-bit results include four 32-bit results of four prior SMS4 encryption rounds and in which the 32-bit value includes a 32-bit round key for a current SMS4 encryption round. Also, in which the storing includes storing the 32-bit result that includes a 32-bit result of a current SMS4 encryption round.

Example 14 includes the method of Example 12 and optionally in which receiving includes receiving the instruction in which the four 32-bit results include four 32-bit round keys for four prior SMS4 key expansion rounds and in which the 32-bit value includes a 32-bit constant to be input to a current SMS4 key expansion round. Also, in which the storing includes storing the 32-bit result that includes a 32-bit round key of a current SMS4 key expansion round.

Example 15 includes the method of any preceding example and optionally in which receiving includes receiving the instruction that has one or more bits specifying whether the current SMS4 round is an SMS4 key expansion round or an SMS4 encryption or decryption round.

Example 16 includes the method of any preceding example and optionally in which receiving includes receiving the instruction that indicates a 128-bit source packed data operand that has the four 32-bit results of the four prior SMS4 rounds arranged according to round order.

Example 17 includes the method of any preceding example and optionally in which storing includes storing the 32-bit result of the current SMS4 round in a result packed data that also includes three of the four 32-bit results from three immediately prior SMS4 rounds of the four prior SMS4 rounds.

Example 18 includes the method of any preceding example and optionally in which receiving includes receiving the instruction that indicates a source packed data operand that has, a first 32-bit result of an immediately prior SMS4 round in bits [31:0], a second 32-bit result of a second prior SMS4 round in bits [63:32], a third 32-bit result of a third prior SMS4 round in bits [95:64], and a fourth 32-bit result of a fourth prior SMS4 round in bits [127:96].

Example 19 includes the method of Example 18 and optionally in which storing includes storing a result packed data that includes, the 32-bit result of the current SMS4 round in bits [31:0], the first 32-bit result of the immediately prior SMS4 round in bits [63:32], the second 32-bit result of the second prior SMS4 round in bits [95:64], and the third 32-bit result of the third prior SMS4 round in bits [127:96].

Example 20 is a system to process instructions that includes an interconnect and a processor coupled with the interconnect. The processor is to receive a first SMS acceleration instruction. The first SMS acceleration instruction is to indicate one or more source packed data operands. The one or more source packed data operands are to have four 32-bit results of four prior SMS4 rounds, and a 32-bit value. The processor, in response to the first SMS acceleration instruction, is to store a result packed data including a 32-bit result of a current SMS4 round in a destination storage location that is to be indicated by the first SMS acceleration instruction. The system also includes a dynamic random access memory (DRAM) coupled with the interconnect. The DRAM stores an SMS4 algorithm. The SMS4 algorithm includes a second SMS acceleration instruction that indicates the result packed data as a source packed data operand.

Example 21 includes the system of Example 20 and optionally in which the result packed data has three 32-bit results of three immediately prior rounds, and in which the 32-bit results in the result packed data are arranged in round order.

Example 22 is an article of manufacture that includes a non-transitory machine-readable storage medium. The non-transitory machine-readable storage medium stores an instruction. The instruction is to indicate one or more source packed data operands. The one or more source packed data operands are to have four 32-bit results of four prior SMS4 rounds, and a 32-bit value. The instruction if executed by a machine is operable to cause the machine to perform operations including storing a 32-bit result of a current SMS4 round in a destination storage location that is to be indicated by the instruction.

Example 23 includes the article of Example 21 and optionally in which the 32-bit result is to be stored in a result packed data along with three 32-bit results corresponding to three immediately prior rounds.

Example 24 includes a processor or other apparatus that is operable to perform the method of any of Examples 12-19.

Example 25 includes a processor or other apparatus that includes means for performing the method of any of Examples 12-19.

Example 26 includes a processor that includes modules, units, logic, circuitry, means, or any combination thereof, to perform the method of any of Examples 12-19.

Example 27 includes a computer system or other electronic device including an interconnect, a processor coupled with the interconnect, and at least one component coupled with the interconnect that is selected from a DRAM, a graphics chip, a wireless communications chip, a phase change memory, and a video camera, the computer system or other electronic device to perform the method of any of Examples 12-19.

Example 28 includes an optionally non-transitory machine-readable medium that optionally stores or otherwise provides an instruction that if and/or when executed by a processor, computer system, or other machine is operable to cause the machine to perform the method of any of Examples 12-19.

Example 29 includes a processor or other apparatus that is operable to perform one or more operations or any method substantially as described herein.

Example 30 includes a processor or other apparatus including means for performing one or more operations or any method substantially as described herein.

Example 31 includes a processor or other apparatus that is operable to perform any of the instructions substantially as described herein.

Example 32 includes a processor or other apparatus including means for performing any of the instructions substantially as described herein.

Example 33 includes a processor or other apparatus including a decode unit that is operable to decode instructions of a first instruction set. The decode unit is to receive one or more instructions that emulate a first instruction, which may be any of the instructions substantially as disclosed herein, and which is to be of a second instruction set. The processor or other apparatus also includes one or more execution units coupled with the decode unit to execute the one or more instructions of the first instruction set. The one or more execution units in response to the one or more instructions of the first instruction set are operable to store a result in a destination. The result may include any of the results substantially as disclosed herein for the first instruction.

Example 34 includes a computer system or other electronic device that includes a processor having a decode unit that is operable to decode instructions of a first instruction set, and having one or more execution units. The computer system also includes a storage device coupled to the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when executed by the processor, are operable to cause the processor to store a result in a destination. The result may include any of the results substantially as disclosed herein for the first instruction.

What is claimed is:

1. A processor comprising:
a plurality of packed data registers;
a decoder to decode an instruction, the instruction to indicate one or more source packed data operands, the one or more source packed data operands to have four 32-bit results of four prior SMS4 rounds, and a 32-bit value; and
an execution unit including at least some circuitry coupled with the decoder and coupled with the plurality of the packed data registers, the execution unit, in response to the instruction, to store a 32-bit result of a current SMS4 round in a destination packed data register of the plurality of packed data registers that is to be indicated by the instruction.

2. The processor of claim 1, in which the decoder is to decode the instruction in which the four 32-bit results are to include four 32-bit results of four prior SMS4 encryption rounds and in which the 32-bit value is to include a 32-bit round key for a current SMS4 encryption round, and in which the execution unit is to store the 32-bit result which is to include a 32-bit result of a current SMS4 encryption round.

3. The processor of claim 1, in which the decoder is to decode the instruction in which the four 32-bit results are to include four 32-bit round keys for four prior SMS4 key expansion rounds and in which the 32-bit value is to include a 32-bit constant to be input to a current SMS4 key expansion round, and in which the execution unit is to store the 32-bit result which is to include a 32-bit round key of a current SMS4 key expansion round.

4. The processor of claim 1, in which the decoder is to decode the instruction that is to have one or more bits to specify whether the current SMS4 round is an SMS4 key expansion round or an SMS4 encryption or decryption round.

5. The processor of claim 4, in which the instruction is to have a single bit to specify whether the current SMS4 round is the SMS4 key expansion round or the SMS4 encryption or decryption round.

6. The processor of claim 1, in which the decoder is to decode the instruction that is to indicate a 128-bit source packed data operand that is to have the four 32-bit results of the four prior SMS4 rounds.

7. The processor of claim 6, in which the 128-bit source packed data operand is to have the four 32-bit results of the four prior SMS4 rounds arranged according to round order.

8. The processor of claim 1, in which the execution unit is to store the 32-bit result of the current SMS4 round in a result packed data that is also to include three of the four 32-bit results from three immediately prior SMS4 rounds of the four prior SMS4 rounds.

9. The processor of claim 8, in which the result packed data is to have each of the three 32-bit results from the three immediately prior SMS4 rounds each shifted by one 32-bit position relative to a corresponding bit position in which they appear in a source operand.

10. The processor of claim 1, in which the decoder is to decode the instruction that is to indicate a source packed data operand that is to have,
    a first 32-bit result of an immediately prior SMS4 round in bits [31:0],
    a second 32-bit result of a second prior SMS4 round in bits [63:32],
    a third 32-bit result of a third prior SMS4 round in bits [95:64], and
    a fourth 32-bit result of a fourth prior SMS4 round in bits [127:96].

11. The processor of claim 10, in which the execution unit is to store a result packed data that is to include,
    the 32-bit result of the current SMS4 round in bits [31:0],
    the first 32-bit result of the immediately prior SMS4 round in bits [63:32],
    the second 32-bit result of the second prior SMS4 round in bits [95:64], and
    the third 32-bit result of the third prior SMS4 round in bits [127:96].

12. A method in a processor comprising:
    receiving an instruction at a decoder of the processor and decoding the instruction with the decoder, the instruction indicating one or more source packed data operands, the one or more source packed data operands having four 32-bit results of four prior SMS4 rounds, and a 32-bit value; and
    storing, with an execution unit of the processor, a 32-bit result of a current SMS4 round in a destination storage location in response to the instruction, the destination storage location indicated by the instruction.

13. The method of claim 12, in which receiving comprises receiving the instruction in which the four 32-bit results include four 32-bit results of four prior SMS4 encryption rounds and in which the 32-bit value includes a 32-bit round key for a current SMS4 encryption round, and in which the storing comprises storing the 32-bit result that includes a 32-bit result of a current SMS4 encryption round.

14. The method of claim 12, in which receiving comprises receiving the instruction in which the four 32-bit results include four 32-bit round keys for four prior SMS4 key expansion rounds and in which the 32-bit value includes a 32-bit constant to be input to a current SMS4 key expansion round, and in which the storing comprises storing the 32-bit result that includes a 32-bit round key of a current SMS4 key expansion round.

15. The method of claim 12, in which receiving comprises receiving the instruction that has one or more bits specifying whether the current SMS4 round is an SMS4 key expansion round or an SMS4 encryption or decryption round.

16. The method of claim 12, in which receiving comprises receiving the instruction that indicates a 128-bit source packed data operand that has the four 32-bit results of the four prior SMS4 rounds arranged according to round order.

17. The method of claim 12, in which storing comprises storing the 32-bit result of the current SMS4 round in a result packed data that also includes three of the four 32-bit results from three immediately prior SMS4 rounds of the four prior SMS4 rounds.

18. The method of claim 12, in which receiving comprises receiving the instruction that indicates a source packed data operand that has,
    a first 32-bit result of an immediately prior SMS4 round in bits [31:0],
    a second 32-bit result of a second prior SMS4 round in bits [63:32],
    a third 32-bit result of a third prior SMS4 round in bits [95:64], and
    a fourth 32-bit result of a fourth prior SMS4 round in bits [127:96].

19. The method of claim 18, in which storing comprises storing a result packed data that includes,
    the 32-bit result of the current SMS4 round in bits [31:0],
    the first 32-bit result of the immediately prior SMS4 round in bits [63:32],
    the second 32-bit result of the second prior SMS4 round in bits [95:64], and
    the third 32-bit result of the third prior SMS4 round in bits [127:96].

20. A system to process instructions comprising:
    an interconnect;
    a processor coupled with the interconnect, the processor to receive a first SMS acceleration instruction, the first SMS acceleration instruction to indicate one or more source packed data operands, the one or more source packed data operands to have four 32-bit results of four prior SMS4 rounds, and a 32-bit value, the processor including a decoder to decode the first SMS acceleration instruction, and the processor, in response to the first SMS acceleration instruction, to store, with an execution unit of the processor, a result packed data including a 32-bit result of a current SMS4 round in a destination packed data register of the processor that is to be indicated by the first SMS acceleration instruction; and
    a dynamic random access memory (DRAM) coupled with the interconnect, the DRAM storing an SMS4 algorithm, the SMS4 algorithm including a second SMS acceleration instruction that indicates the result packed data as a source packed data operand.

21. The system of claim 20, wherein the result packed data has three 32-bit results of three immediately prior rounds, and wherein the 32-bit results in the result packed data are arranged in round order.

22. An article of manufacture comprising a non-transitory machine-readable storage medium, the non-transitory machine-readable storage medium storing an instruction,
    the instruction to indicate one or more source packed data operands, the one or more source packed data operands to have four 32-bit results of four prior SMS4 rounds, and a 32-bit value, and the instruction if performed by a machine that includes a decoder to decode the instruction is operable to cause the machine to perform operations comprising:
    storing a 32-bit result of a current SMS4 round in a destination packed data register of the machine that is to be indicated by the instruction.

23. The article of claim 22, wherein the 32-bit result is to be stored in a result packed data along with three 32-bit results corresponding to three immediately prior rounds.

* * * * *